US010733128B2

(12) United States Patent
Kamiyamane

(10) Patent No.: US 10,733,128 B2
(45) Date of Patent: Aug. 4, 2020

(54) PROCESSOR AND DATA TRANSFER METHOD

(71) Applicant: NEC Corporation, Minato-ku, Tokyo (JP)

(72) Inventor: Shin Kamiyamane, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/398,055

(22) Filed: Jan. 4, 2017

(65) Prior Publication Data

US 2017/0206180 A1 Jul. 20, 2017

(30) Foreign Application Priority Data

Jan. 15, 2016 (JP) ................................ 2016-005771

(51) Int. Cl.
G06F 13/362 (2006.01)
G06F 13/40 (2006.01)
G06F 13/364 (2006.01)

(52) U.S. Cl.
CPC ........ G06F 13/4022 (2013.01); G06F 13/364 (2013.01)

(58) Field of Classification Search
USPC .................................................. 710/113, 309
See application file for complete search history.

(56) References Cited

U.S. PATENT DOCUMENTS

| 5,239,651 A | 8/1993 | Sodos | |
|---|---|---|---|
| 2002/0176301 A1* | 11/2002 | Kim | G11C 11/406 365/222 |
| 2003/0091040 A1 | 5/2003 | Furukawa | |
| 2013/0007560 A1* | 1/2013 | Subashchandrabose | G06F 11/1004 714/758 |
| 2013/0326113 A1* | 12/2013 | Wakrat | G06F 12/0868 711/103 |
| 2014/0047206 A1 | 2/2014 | Ochiai | |
| 2015/0006762 A1* | 1/2015 | Lee | G06F 13/1673 710/5 |
| 2015/0006841 A1* | 1/2015 | Chen | G06F 13/4239 711/167 |

(Continued)

FOREIGN PATENT DOCUMENTS

| JP | H06-236344 A | 8/1994 |
|---|---|---|
| JP | 2003-150395 A | 5/2003 |

(Continued)

OTHER PUBLICATIONS

Japanese Office Action for JP Application No. 2016-005771 dated Mar. 14, 2017 with English Translation.

*Primary Examiner* — Ilwoo Park

(57) ABSTRACT

A processor includes, an engine that transmits a read command or the other command; and a command transfer unit that performs arbitration to select a command to be executed among the commands transmitted from the engines and outputs the command selected, wherein the command transfer unit that, in case that the read command is selected on the arbitration, brings a subsequent read command into the arbitration after a period represented an issue interval control value in relation to a data transfer length of the read command selected, the subsequent read command being transmitted from the engine which has transmitted the read command selected on the arbitration.

18 Claims, 10 Drawing Sheets

(56) References Cited

U.S. PATENT DOCUMENTS

| | | | | |
|---|---|---|---|---|
| 2015/0149675 A1* | 5/2015 | Toyoda | ............... | G06F 13/1605 |
| | | | | 710/113 |
| 2016/0117119 A1* | 4/2016 | Kim | ................... | G06F 13/1642 |
| | | | | 711/103 |
| 2017/0153824 A1* | 6/2017 | Luan | ..................... | G06F 3/0659 |

FOREIGN PATENT DOCUMENTS

| JP | 2005-285042 A | 10/2005 |
|---|---|---|
| JP | 2011-095966 A | 5/2011 |
| JP | 2014-035628 A | 2/2014 |
| JP | 5571327 B2 | 8/2014 |
| WO | 2015/198395 A1 | 12/2015 |

* cited by examiner

Fig. 2

| TRANSFER LENGTH | | 128B | 64B | 32B | 16B | 8B |
|---|---|---|---|---|---|---|
| ISSUE INTERVAL CONTROL VALUE | WITHOUT REPLY HEADER INFORMATION | 16T | 8T | 4T | NONE | NONE |
| | WITH REPLY HEADER INFORMATION | 17T | 9T | 5T | NONE | NONE |

B:BYTE
T:CLOCK

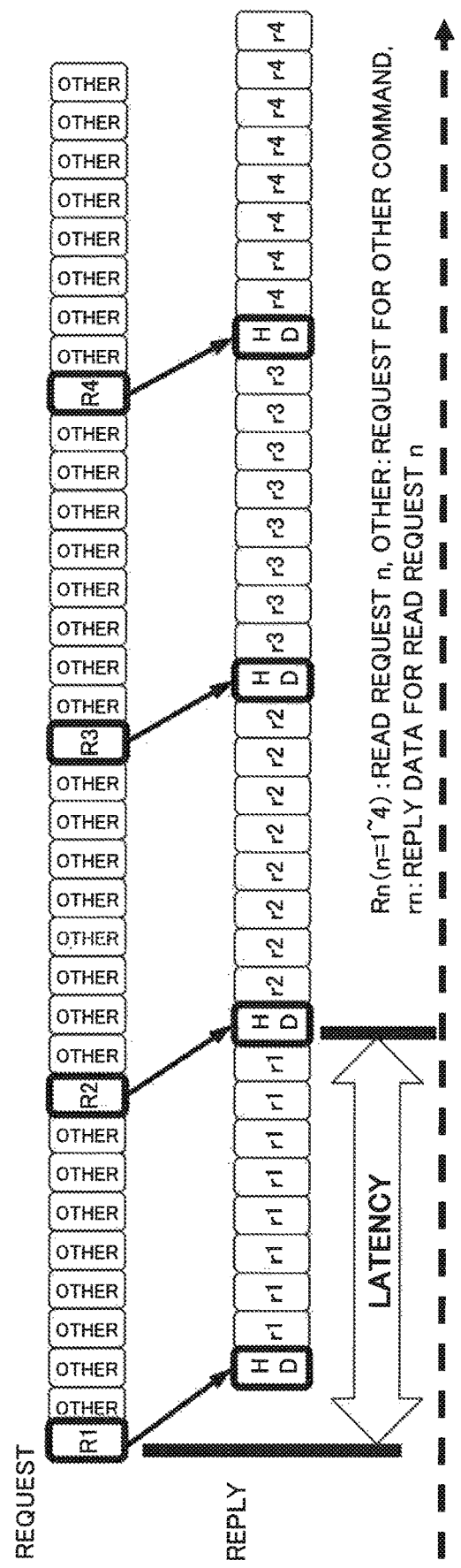

ature, and the command transfer controller 1 inputs each of the commands into a corresponding port of a crossbar switch 2. The crossbar switch 2 is provided with a function of adjusting timing for participating in arbitration of a command in accordance with a data
PROCESSOR AND DATA TRANSFER METHOD

INCORPORATION BY REFERENCE

This application is based upon and claims the benefit of priority from Japanese Patent Application No. 2016-005771, filed on Jan. 15, 2016, the disclosure of which is incorporated herein in its entirety by reference.

TECHNICAL FIELD

The present invention relates to a processor and a data transfer method, and more particularly to a processor of an SIMD (Single Instruction Multiple Data) type computer and a data transfer method.

BACKGROUND ART

Patent Literature 1 discloses a system provided with a plurality of nodes having a shared memory, which shortens latency of the shared memory. When a request is issued from each of the plurality of nodes, the system stores control information specifying a sender of the request, and determines a request to be returned first from the issued requests to shorten the latency.

CITATION LIST

Patent Literature

[Patent Literature 1]
Japanese Patent Publication No. 5571327

SUMMARY

Technical Problem

A vector type super computer and an SIMD type computer represented by a GPGPU (General-Purpose Graphics Processing Unit) reply many data by one command. Thus, in the SIMD type computer, a reply path tends to be a bottleneck of performance. A trend for a multi-core structure in recent years causes various commands from more cores to be executed in multi-parallel, and contention for a reply path tends to further increase. When many reply data are mixed, time for collecting the reply data corresponding to each command increases, and latency for each command becomes large. It is a big issue not to cause overall performance of an apparatus to deteriorate by suppressing the latency to the minimum. In addition, it is also an important point to cause a hardware resource that is a component to operate to the maximum without any waste in order to maximize the overall performance.

The system disclosed in Patent Literature 1 is unable to reduce contention for a reply path.

The present invention has an object to provide a processor and a data transfer method to solve the problem described above.

Solution to Problem

One aspect of a processor according to the present invention, includes: an engine that transmits a read command or the other command; and a command transfer unit that performs arbitration to select a command to be executed among the commands transmitted from the engines and outputs the command selected, wherein the command transfer unit that, in case that the read command is selected on the arbitration, brings a subsequent read command into the arbitration after a period represented an issue interval control value in relation to a data transfer length of the read command selected, the subsequent read command being transmitted from the engine which has transmitted the read command selected on the arbitration.

One aspect of a data transfer method according to the present invention includes: transmitting a read command or the other command; and performing arbitration to select a command to be executed among the commands transmitted from the engines and outputting the command selected; wherein in case that the read command is selected on the arbitration, bringing a subsequent read command into the arbitration after a period represented an issue interval control value in relation to a data transfer length of the read command selected, the subsequent read command being transmitted from an engine which has transmitted the read command selected on the arbitration.

Advantageous Effects of Invention

The processor according to the present invention shortens latency when reading reply data in an SIMD type computer.

BRIEF DESCRIPTION OF THE DRAWINGS

FIG. 2 illustrates a table indicating issue interval control values;

FIG. 7B is a timing diagram when reply data include header information; and

EXAMPLE EMBODIMENT

First Example Embodiment

Overview

Figure 1:
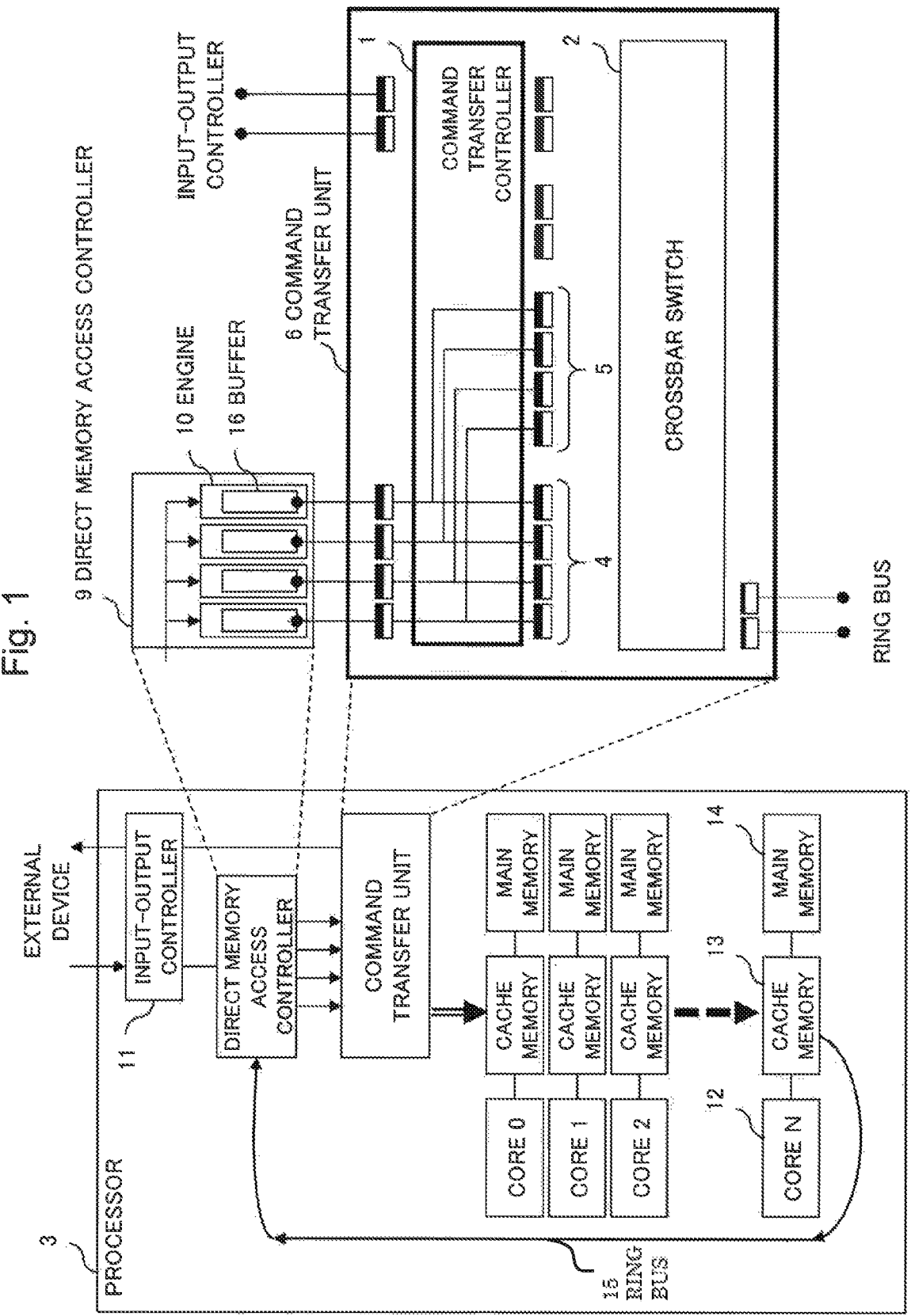
FIG. 1 is a diagram illustrating a configuration of a processor according to a first example embodiment.

A processor 3 according to the present example embodiment includes a command transfer controller 1 that identifies a class of commands, and a data transfer length, for example. The commands are classified into a read command and commands other than the read command (hereinafter referred to as other commands), and the command transfer controller 1 inputs each of the commands into a corresponding port of a crossbar switch 2. The crossbar switch 2 is provided with a function of adjusting timing for participating in arbitration of a command in accordance with a data transfer length of the read command. The timing for participating in the arbitration is determined on the basis of a value previously provided for each the data transfer length of the read command.

The crossbar switch 2 causes other commands to participate in the arbitration for each clock to fill up an interval of the arbitration described above of the read command. The crossbar switch 2 includes read-command-input ports 4 and other-input ports 5. The input ports of the crossbar switch 2 are separated into one for the read command and others for the other commands, and even when issue intervals for transmitting the read command are set, execution of the other commands continues.

Thus, the processor 3 according to the present example embodiment can cause a hardware resource to operate without any waste, and improve overall performance.

Configuration

FIG. 1 is a diagram illustrating a configuration of the processor 3 according to the present example embodiment. The processor 3 includes an input-output controller 11, a direct memory access controller 9, a command transfer unit 6, a core 12, a cache memory 13, and a main memory 14. The direct memory access controller 9, the command transfer unit 6, the cache memory 13, and the main memory 14 are connected to one another through a ring bus 15. The input-output controller 11 is connected to the direct memory access controller 9, the command transfer unit 6, and the core 12.

The direct memory access controller 9 includes one or more engines 10, and each of the engines 10 includes a buffer 16.

The command transfer unit 6 includes the command transfer controller 1 and the crossbar switch 2. The crossbar switch 2 includes the read-command-input ports 4 and the other-input ports 5, both of which belong to each of the engines 10.

Each of the engines 10 is connected through the command transfer controller 1 to the read-command-input port 4 and the other-input port 5, both of which are included in the crossbar switch 2, and correspond to the own device.

The engine 10 is a controller with a DMA (Direct Memory Access) function, and is a so-called DMA engine. The engine 10 sequentially receives a command from an external device through the input-output controller 11, and executes the received command, for example. The engine 10 may receive a command from the core 12.

The commands received in the engines 10 are classified into the read command and the other commands. The read command is a command to read out a plurality of reply data from the cache memory 13, the main memory 14, or a register in the core 12.

When receiving the read command, the engine 10 issues a reply-data read-request to a plurality of cache memories 13, main memories 14, or cores 12, for example, and receives returned reply data through the ring bus 15. The engine 10 accumulates the received reply data in the buffer 16 provided inside the engine 10 until all reply data read out by one read command are collected. When all reply data read out by the one read command are collected, the engine 10 outputs all the collected reply data to the outside such as the main memory 14 designated by the read command to release a region in the buffer 16 where the reply data are stored.

The engine 10 can execute a plurality of read commands in parallel, but the engine 10 cannot execute a new read command when the buffer 16 is full, or near full, that is, when a free space reaches a predetermined criterion or less.

When receiving a command, the engine 10 transmits the command to the command transfer controller 1 in order to measure executable timing of the command before executing the command.

The direct memory access controller 9 contains a function of assigning a command supplied from the input-output controller 11, or reply data supplied from the ring bus 15, to each of the engines 10.

The command transfer controller 1 decodes a command transmitted by each of the engines 10, and classifies the command into the read command and the other commands. When the command is the read command, the read command is transmitted to the read-command-input port 4 that belongs to each of the engines 10, together with an issue interval control value described later. When the command received from the engine 10 is one of the other commands, the command transfer controller 1 transmits the other command to the other-input port 5 that belongs to the engine 10.

The crossbar switch 2 performs arbitration by performing selection of a command to be executed by causing commands transmitted to the read-command-input port 4 or the other-input port 5 from the respective engines 10 as candidates to pass through the crossbar switch 2. The arbitration is performed for each clock by a fixed priority system or a round robin system, for example. The engine 10 that transmitted a command which passed through the crossbar switch 2 executes the command which passed through. Hereinafter, there may be a case in which a command is executed after passing through the crossbar switch 2 that is referred to as "win arbitration".

When causing the read command to pass through the read-command-input port 4 that belongs to a certain engine 10, the crossbar switch 2 does not cause a subsequent read command to pass through the port for a period of time indicated by an issue interval control value added to the read command caused to pass through.

The processor 3 includes a plurality of cores 12, and the cache memory 13 and the main memory 14 are connected to each of the cores 12. When a received read command passes through the crossbar switch 2, the engine 10 issues a reply-data-read-request to the core 12, the cache memory 13, and the main memory 14 that store respective data to be a target of the read command. The core 12, the cache memory 13, and the main memory 14, which received the reply-data-read-request, transmit requested reply data to the engine 10 that issued the request, through the ring bus 15. During this period, the core 12 performs normal processing, such as execution of an application program.

Reply data below are transmitted to each section in the ring bus 15. A request is transmitted through a section (a double line section in FIG. 1) between the command transfer unit 6 and the first core 12/cache memory 13/main memory 14 (hereinafter abbreviated to a memory and the like). The request and read-out reply data are transmitted through a section (a broken line section) between the first memory and the like, and the last memory and the like. Reply data are transmitted through a section (a solid line section) between the last memory and the like, and the direct memory access controller 9.

FIG. 2 illustrates a table indicating issue interval control values. As illustrated in FIG. 2, the issue interval control value is given, depending on a reply data transfer length of a read command. The transfer length is given by a byte count, and the issue interval control value is given by a clock number. For example, 4T (4-clock) of an issue interval control value means that after a read command with a transfer length of 32-byte without reply header information wins arbitration, the crossbar switch 2 causes the read-command-input port 4, which transmits the command, to participate in the subsequent arbitration after the elapse of a 4-clock interval. Likewise, after a read command with a reply data transfer length of 64-byte wins the arbitration, the crossbar switch 2 causes the read-command-input port 4 to participate in the arbitration after the elapse of an 8-clock interval, and after a read command with a reply data transfer length of 128-byte wins the arbitration, the crossbar switch 2 causes the read-command-input port 4 to participate in the arbitration after the elapse of a 16-clock interval.

The example described above illustrates data by adopting a configuration in which one piece of reply data is transferred by 8-byte per clock, and therefore time required for reply data transfer is 64-byte (8-byte multiplied by 8-clock), for example.

When there is reply header information at the time of reply data transfer, an issue interval control value becomes larger by 1-clock than the case in which there is no reply header information. This is because 1-clock is required to transfer reply header information.

The input-output controller 11, the direct memory access controller 9, and the command transfer unit 6 are configured by a logic circuit and a semiconductor memory element, such as a flip-flop circuit and a SRAM (Static Random Access Memory).

Control performed by the processor 3 according to the present example embodiment is different from control of reducing a load, such as congestion and flow control. In the processor 3, a reply path that includes the buffer 16 which becomes a bottleneck of performance and load can exhibit a full throughput. Meanwhile, a resource of a request path can cause a band to fully operate by continuously issuing a command other than a read command. The processor 3 according to the present example embodiment has a feature of performing control by hardware itself without using software.

Operation

Figure 3:
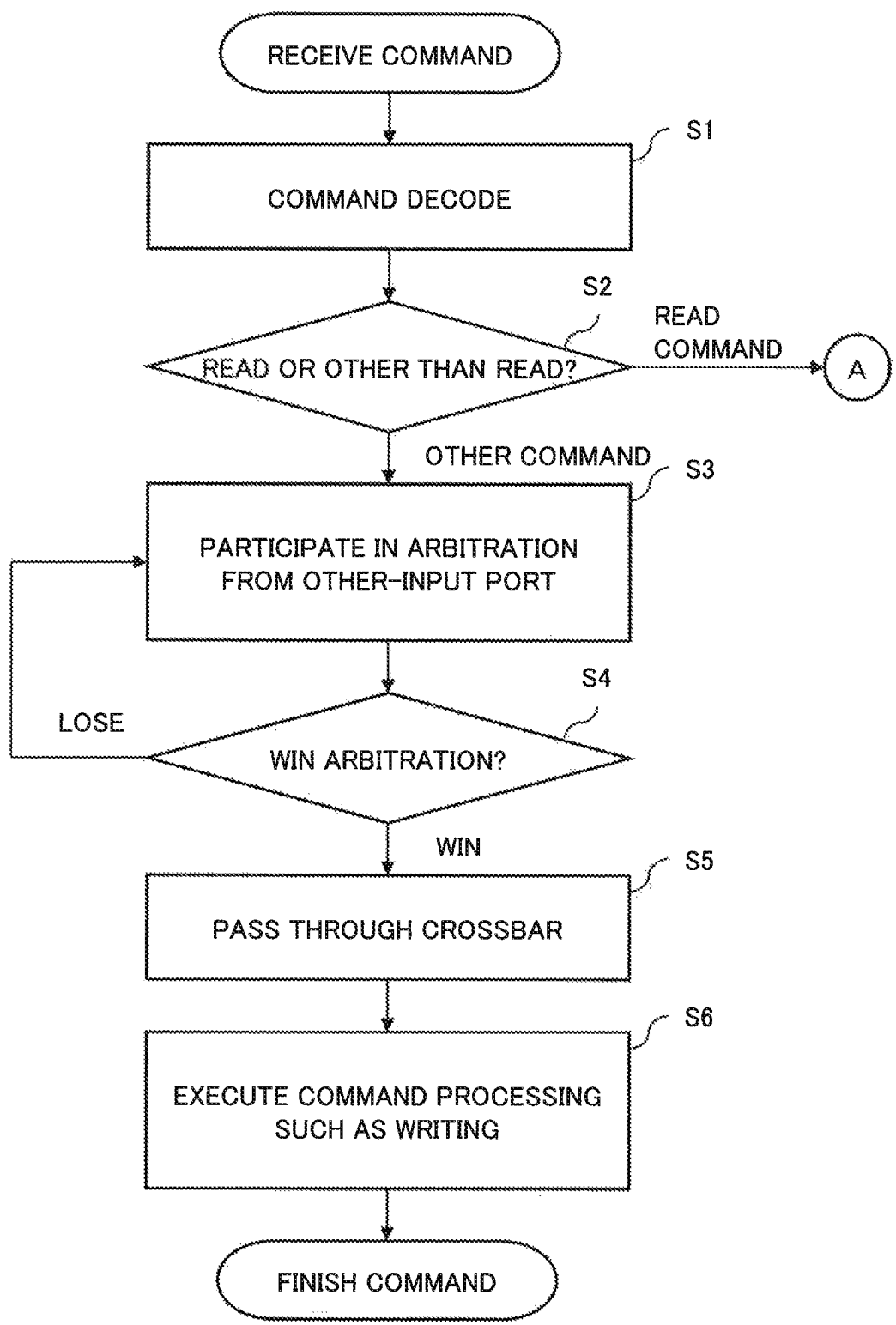
FIG. 3 is an operation flow chart (1) of a processor.
Figure 4:
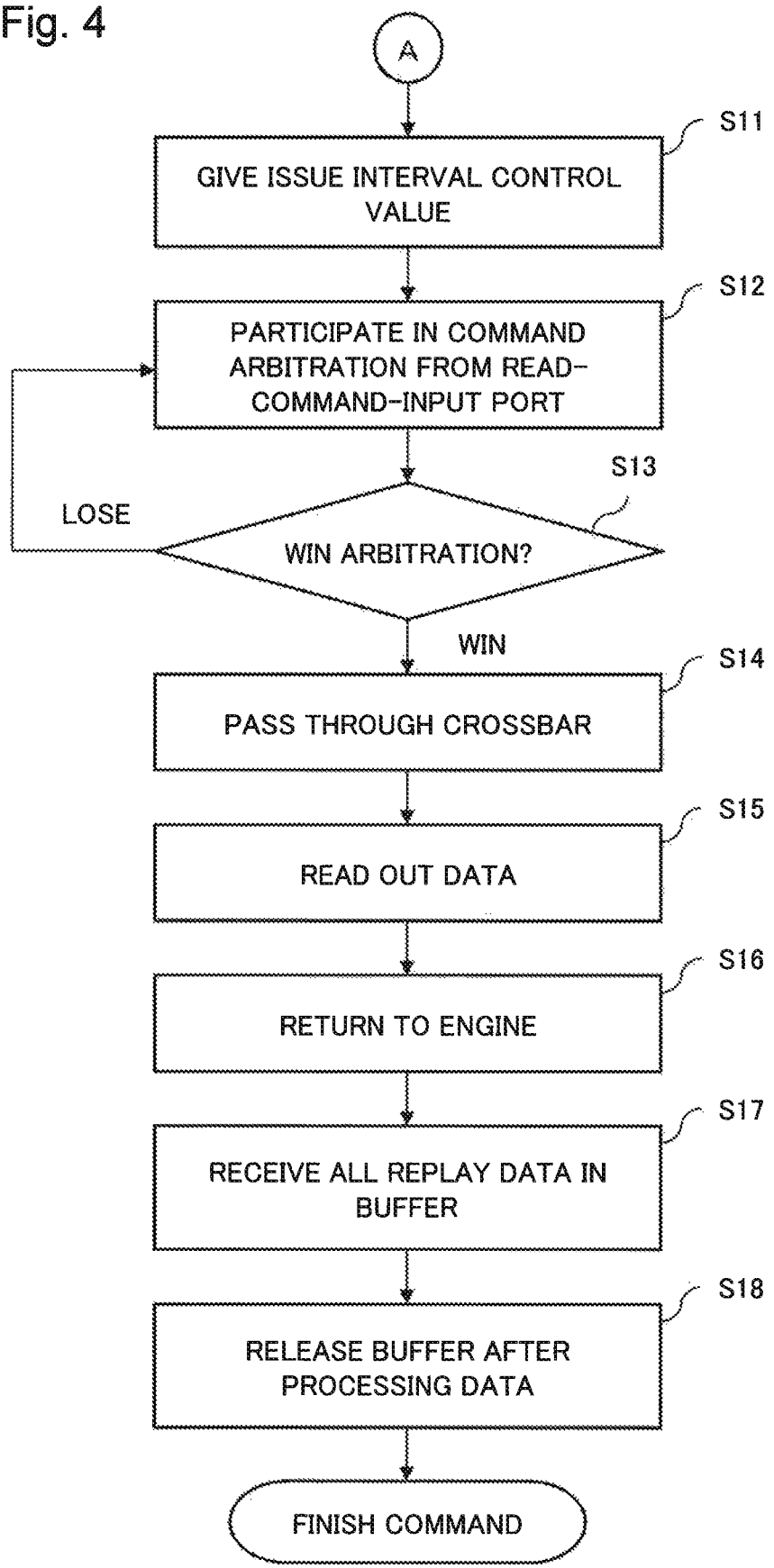
FIG. 4 is an operation flow chart (2) of a processor.

FIGS. 3 and 4 are an operation flow chart of the processor 3.

The command transfer controller 1 that received a command from the engine 10 decodes the command (S1), and classifies the command into a read command and other commands (S2). In the case of the read command (read command in S2), the command transfer controller 1 gives a value of issue interval control indicated in the table of FIG. 2 to the command (S11), and transmits the command to the read-command-input port 4 of the crossbar switch 2 (S12). In the case of the other command (other command in S2), the command transfer controller 1 transmits the command to the other-input port 5 of the crossbar switch 2 (S3).

The transmitted commands participate in arbitration in the crossbar switch 2 (S3 and S12). When a read command wins the arbitration (win in S13), the crossbar switch 2 provides an interval by the time the read-command-input port 4, that wins, participates in the arbitration. The interval is a period of time indicated by a value given in accordance with the table of FIG. 2.

When lost in the arbitration (lose in S13), the read command participates in the arbitration also in the subsequent clock. In the arbitration, other commands participate in the arbitration for every clock regardless of a win or a loss.

When the read command wins the arbitration (win in S13) and passes through the crossbar switch 2 (S14), the engine 10 reads out data that are a target for reading from the cache memory 13 in the processor 3, the main memory 14, or a register in the core 12 in accordance with the read command (S15). The read-out reply data are returned to the engine 10 in the direct memory access controller 9 (S16), and are stored in the buffer 16 (S17).

When all reply data with a transfer length instructed by the read command are collected, the engine 10 outputs the reply data to the main memory 14 designated by the read command to release the buffer 16, whereby a subsequent command can be executed (S18).

When the other command wins arbitration (win in S4) and passes through the crossbar switch 2 (S5), the engine 10 executes processing according to the other command (S6).

Figure 5:
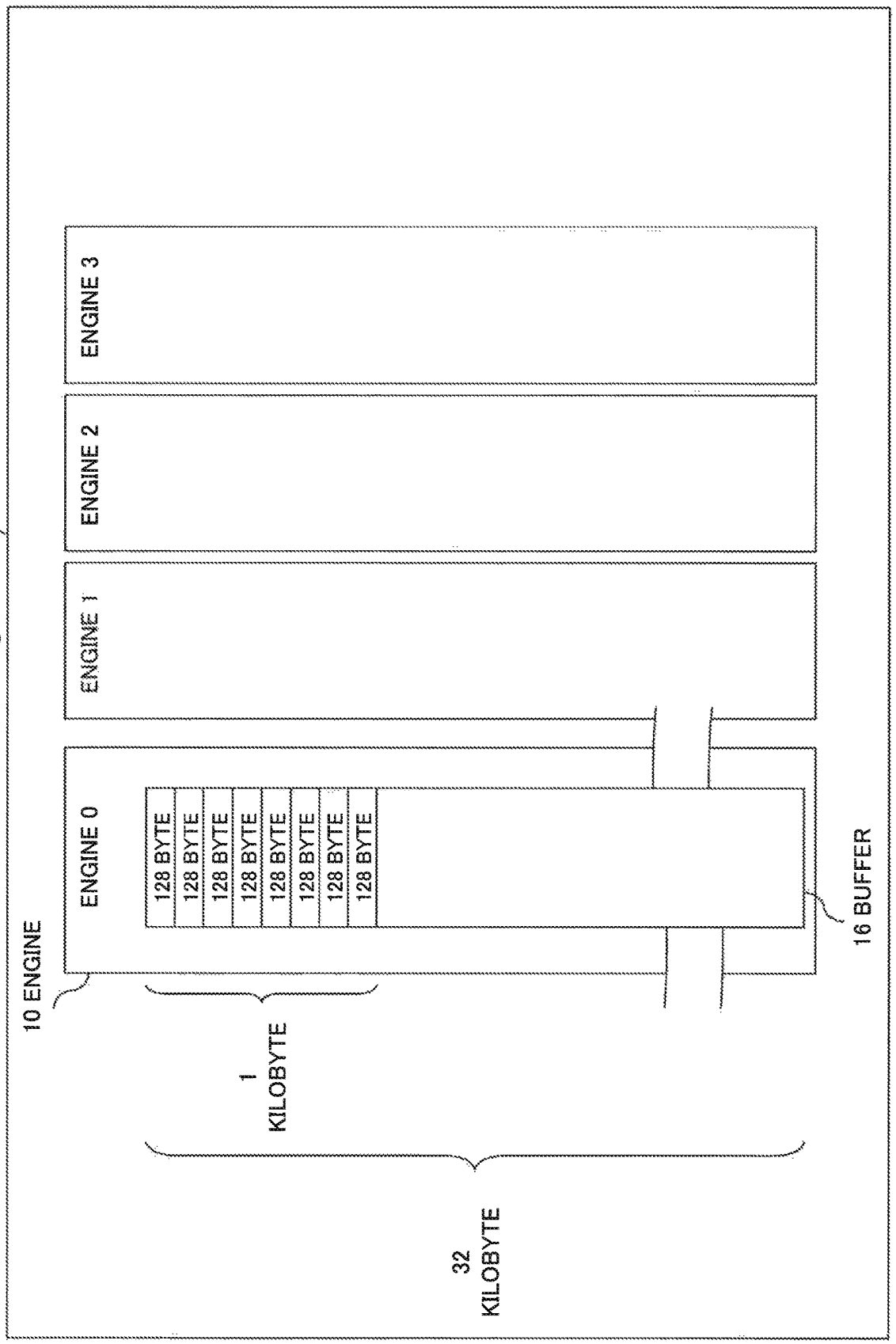
FIG. 5 is a diagram illustrating a buffer included in an engine.

FIG. 5 is a diagram illustrating the buffer 16 included in the engine 10. For example, the buffer 16 in one of the engines 10 has a capacity of 32-kilobyte, and can store reply data that are acquired by a read command with a transfer length of 1 kilobyte for 32 commands. When the engine 10 issues a read request for reply data with 1 kilobyte by dividing into 8 read requests, the engine 10 results in issuing 8 read requests each with a transfer length of 128-byte because 1 kilobyte is equal to 128-byte multiplied by 8.

The read command with a transfer length of 128-byte is completed when the engine 10 receives 16 pieces of reply data each with 8-byte. The engine 10 outputs the reply data to release the buffer 16. Thus, when 8 pieces of the reply data are received with a continuous clock, latency of the read command can be minimized.

Figure 6A:
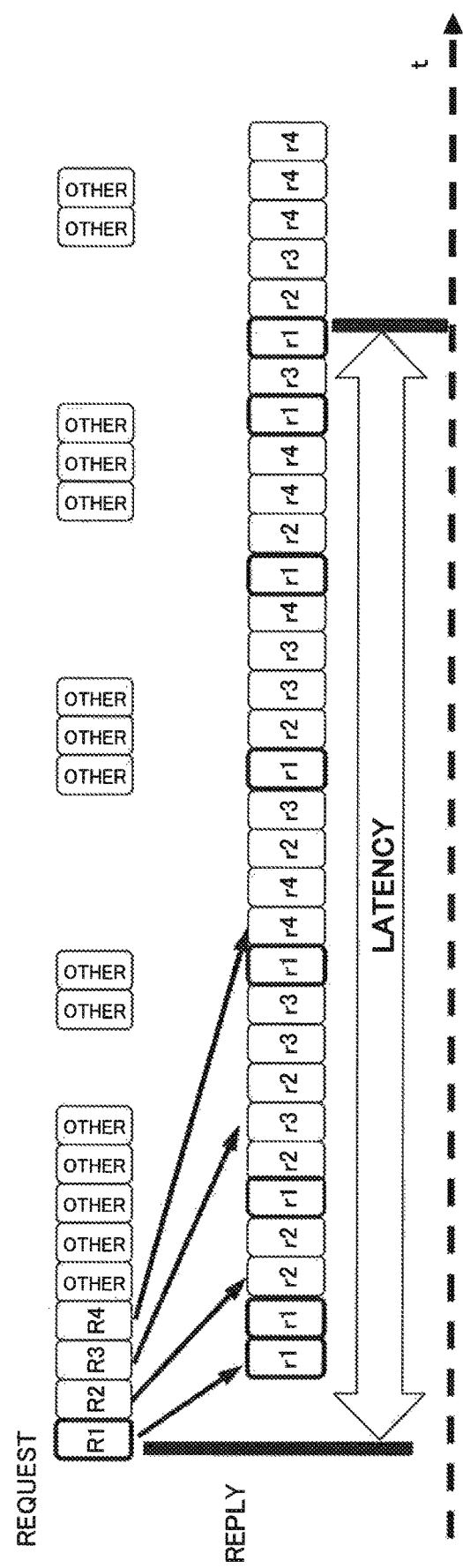
FIG. 6A is a timing diagram illustrating timing when an engine issues a read request and timing when read-out reply data are stored in a buffer of an engine, when the first example embodiment is not applied.
Figure 6B:
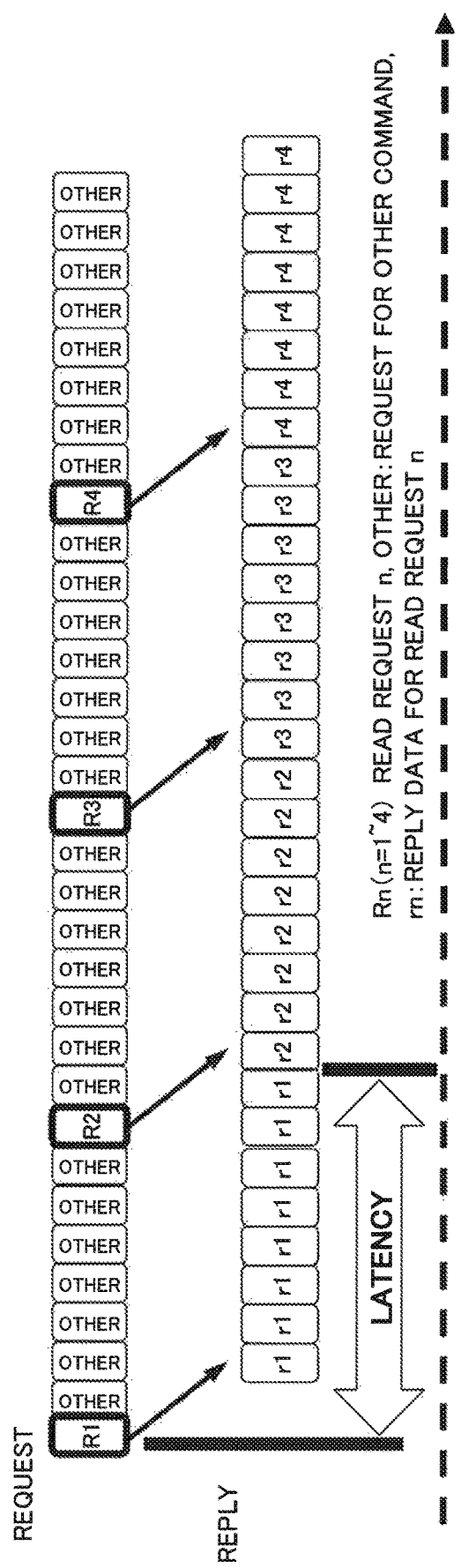
FIG. 6B is a timing diagram illustrating timing when an engine issues a read request and timing when read-out reply data are stored in a buffer of an engine, when the first example embodiment is applied.

FIG. 6 is a timing diagram illustrating timing when the engine 10 issues a read request and illustrating timing when read-out reply data are stored in the buffer 16 in the engine 10, by comparing before and after application of the present invention.

The timing diagram of FIG. 6 illustrates a case, as an example, where a reply data transfer length of a read command is 64-byte, and a read unit is 8-byte. Herein, reply data for a read request Rn (n is from 1 to 4) are expressed as rn. In addition, a request related to other commands is expressed as "other". The same applies to a timing diagram of the next drawing (FIG. 7).

When an issue interval of a read command is not particularly controlled (FIG. 6A), latency by the time all reply data for one read command are collected varies because reply data are mixed with each other in the buffer 16. As issued commands increase, latency deteriorates.

That is, in this case, reply data for a plurality of read commands contend with each other in the buffer 16, and are mixed with each other to cause the latency to become large, whereby an issue rate of a request decreases. Then, requests are spaced in a steady state, and overall performance gradually deteriorates.

Meanwhile, in the case of the processor 3 according to the present example embodiment (FIG. 6B), a subsequent read command is issued after the elapse of an appropriate interval in accordance with a reply data transfer length of a read command, whereby reply data of a mutual read command are not mixed with each other, and latency is not delayed. Thus, the buffer 16 is released sooner, and a subsequent command is executed sooner. A general command of writing or the like, that is a command other than a read command, is executed between a read command and a subsequent read command, whereby there is no space for issuing a request, which causes resources in the entire processor 3 to operate without any waste. Naturally, there is also no space at the timing when reply data arrive at the buffer 16.

That is, in this case, latency is short, and a subsequent request can be issued without a space.

FIG. 7 is a timing diagram when reply data have header information. Other conditions are similar to FIG. 6.

Figure 7A:
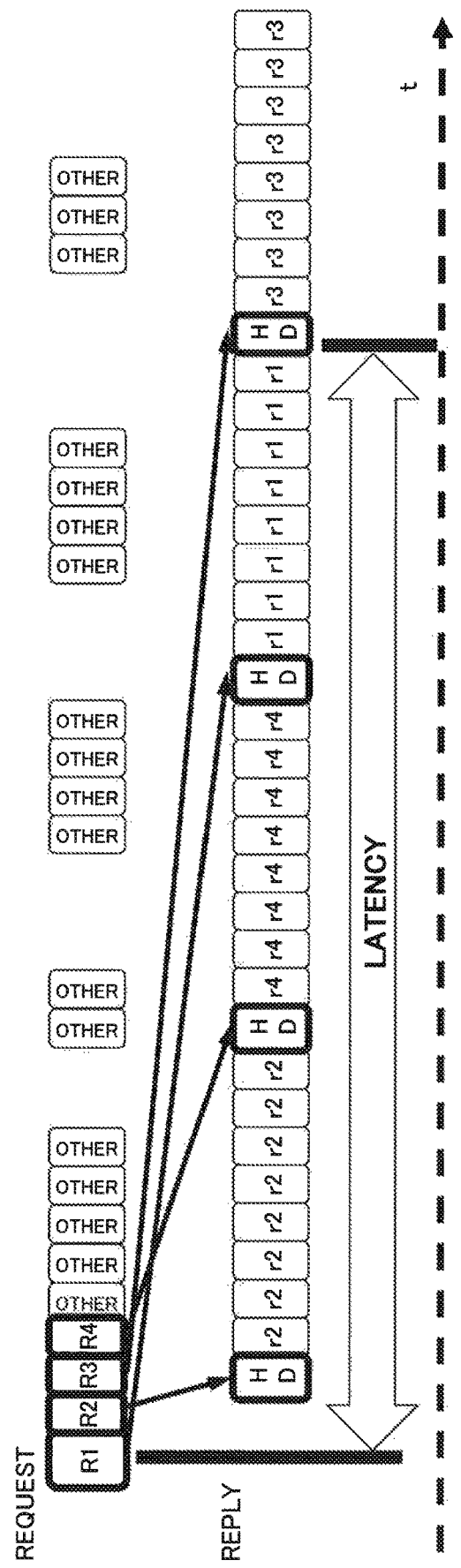
FIG. 7A is a timing diagram when reply data include header information.

Reply header information is information for continuously returning reply data corresponding to one read command without a space. Control by this information is publicly known. FIG. 7A illustrates a case in which four read commands are issued from one of the engines 10 without an interval. In this case, reply data are continuously returned to four read commands by respective reply header information. However, a return order of the data may be switched with each other. The order varies depending on which read command reads out reply data in what memory. Due to the switch of order, latency is delayed.

That is, in this case, even when reply data are continuously received in units of a read command, the reply data in units of a read command are considered to be in no particular order, thereby causing latency to become large, which decreases an issue rate. Then, requests are spaced in a steady state, and overall performance gradually deteriorates.

Meanwhile, in the case of the processor 3 according to the present example embodiment (FIG. 7B), an appropriate interval in accordance with a reply data transfer length is provided in read commands issued from the same engine 10, whereby the order of reply data is not switched. Thus, the buffer 16 is released sooner, and a subsequent command is issued sooner.

That is, also in this case, latency is short, and a subsequent request can be issued without a space.

Modification

FIG. 1 illustrates a configuration in which the command transfer unit 6 is connected with the core 12, the cache memory 13, and the main memory 14 through the ring bus 15 inside the processor 3, but a general crossbar may be used for connection.

There may be one engine 10 included in the processor 3. In this case, arbitration can be performed only between a read command and other commands of the engine 10, and therefore the processor 3 may be configured not to include the crossbar switch 2 by incorporating the arbitration function into the command transfer controller 1. In other words, the command transfer unit 6 and the command transfer controller 1 may be identical.

The number of components, capacity, and a size of reply data transfer are not limited to values illustrated above. For example, the number of the read-command-input ports 4 included in the crossbar switch 2, the number of the engines 10, capacity of the buffer 16, a value of an issue interval control value, and a unit of transfer per clock, may be appropriately changed.

Effect

As a first effect, the processor 3 according to the present example embodiment shortens latency when reading reply data, and executes a subsequent command without delay. Therefore, the processor 3 can suppress deterioration of overall performance even when a large number of data transfer contend with each other. The reason is that the command transfer unit 6 adjusts issue timing of a read command in accordance with a throughput of reply data.

As a second effect, the processor 3 according to the present example embodiment can cause a hardware resource to operate without any waste. The reason is that commands other than a read command are issued without a space while the command transfer unit 6 adjusts issue timing of the read command. That is, overall performance is improved. This is different from control of reducing a load, such as congestion and flow control. The processor 3 can fully utilize both bands of a request path and a reply path, and can maintain a maximum throughput.

As a third effect, the processor 3 according to the present example embodiment does not need to use software for control of the data transfer. The reason is that hardware adjusts timing of the data transfer.

Second Example Embodiment

Figure 8:
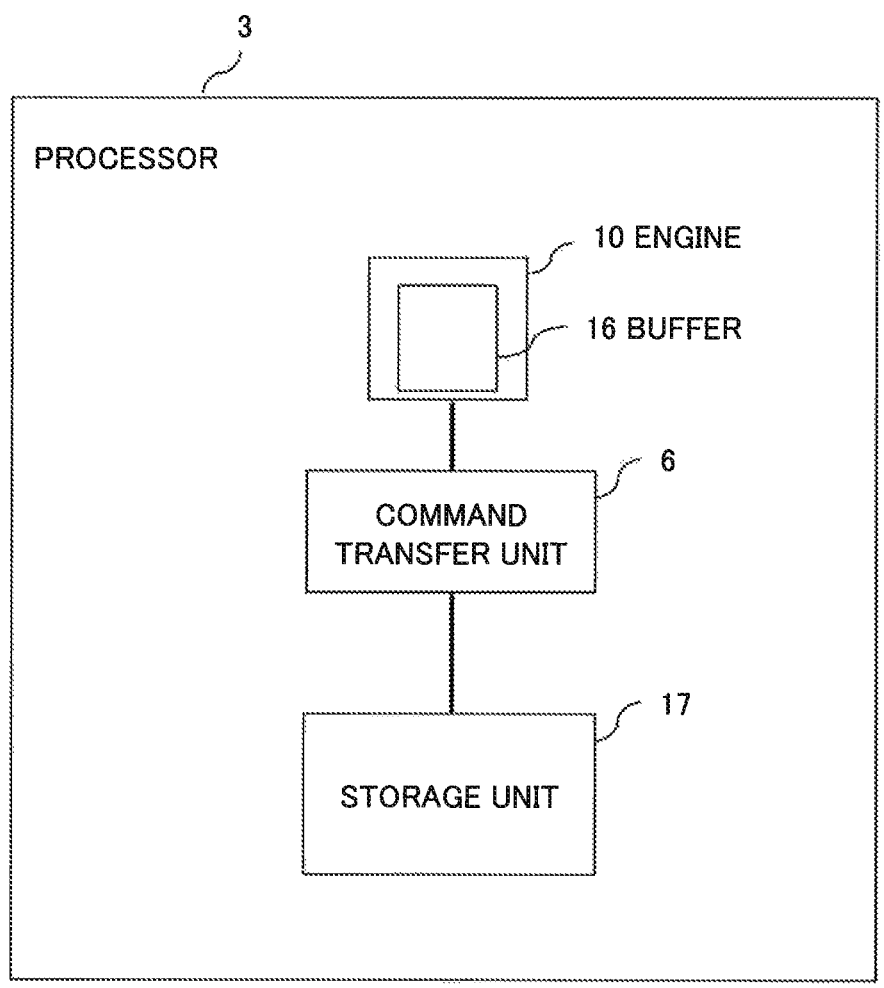
FIG. 8 is a diagram illustrating a configuration of a processor according to a second example embodiment.

FIG. 8 is a diagram illustrating a configuration of a processor 3 according to the present example embodiment. The processor 3 includes an engine 10, a command transfer unit 6, and a storage unit 17.

The engine 10 is a device that sequentially receives a command to transmit the command to the command transfer unit 6, and that executes the command passing through the command transfer unit 6. The engine 10 issues a plurality of data read requests to the storage unit 17 when a command is a read command, and receives returned reply data to store the reply data in a buffer 16. When receiving all reply data of the read command, the engine 10 outputs the reply data to the outside.

The command transfer unit 6 receives a command from the engine 10 at regular intervals and causes the command to pass through the command transfer unit 6. However, after a read command passes through the command transfer unit 6, the command transfer unit 6 does not cause a subsequent read command transmitted from the engine 10 that transmitted the read command caused to pass through the command transfer unit 6, for a period of time indicated by an issue interval control value provided in accordance with a data transfer length of the read command caused to pass through.

The storage unit 17 is a device for storing reply data, and includes a register in a core 12, a cache memory 13, or a main memory 14, for example.

As a first effect, the processor 3 according to the present example embodiment shortens latency when reading reply data, and executes a subsequent command without delay. Therefore, the processor 3 can suppress deterioration of overall performance even when a large number of data transfer contend with each other. The reason is that the command transfer unit 6 adjusts issue timing of a read command in accordance with a throughput of reply data.

As a second effect, the processor 3 according to the present example embodiment can cause a hardware resource to operate without any waste. The reason is that commands other than a read command are issued without a space while the command transfer unit 6 adjusts issue timing of the read command. That is, overall performance is improved. This is different from control of reducing a load, such as congestion and flow control. The processor 3 can fully utilize both bands of a request path and a reply path, and can maintain a maximum throughput.

As described above, while the invention of the present application is described with reference to the example embodiments, the invention of the present application is not limited to the example embodiments described above. Various modifications within the scope of the invention of the present application that can be perceived by a person skilled in the art can be applied to the configuration and the detail of the invention of the present application.

REFERENCE SIGNS LIST

1 Command transfer controller
2 Crossbar switch
3 Processor
4 Read-command-input port
5 Other-input port
6 Command transfer unit
9 Direct memory access controller
10 Engine
11 Input-output controller
12 Core
13 Cache memory
14 Main memory
15 Ring bus
16 Buffer
17 Storage unit

The invention claimed is:

1. A processor comprising:
a direct memory access controller that includes a plurality of engines transmitting commands;
a crossbar switch that includes a plurality of read-command-input ports respectively corresponding to the plurality of engines and a plurality of other-command-input ports respectively corresponding to the plurality of engines; and
a command transfer controller configured to:
classify the commands transmitted from the engines into a read command and an other command, and transmit a command classified as the read command to a corresponding read-command-input port, and transmit a command classified as the other command to a corresponding other-command-input, wherein
the crossbar switch performs arbitration to select a command to be executed among the commands transmitted from the engines and output the command selected, and
the crossbar switch, in case that the read command is selected on the arbitration, brings a subsequent read command into the arbitration after a period represented an issue interval control value corresponding to a data transfer length of the read command selected, the subsequent read command is transmitted from the engine which has transmitted the read command selected on the arbitration.

2. The processor according to claim 1, wherein
the command transfer controller is further configured to adjust timing for participating in arbitration of a command in accordance with a data transfer length of the read command, and cause other commands to participate in the arbitration for each clock to fill up an interval of the arbitration described above of the read command.

3. The processor according to claim 1, wherein
the command transfer controller is further configured to perform the arbitration to select the other command during the period of represented the issue interval control value.

4. The processor according to claim 1, further comprising, a storage unit configured to store data, wherein
each of the plurality of engines includes a buffer,
each of the plurality of engines is configured to issue a read request to the data in the storage unit and accumulate the data replied from the storage unit in the buffer when the read command transmitted from the engine is selected on the arbitration.

5. The processor according to claim 4, wherein
the storage includes a cache memory and a main memory that belongs to each of a plurality of cores.

6. The processor according to claim 1, wherein
the direct memory access controller is further configured to output the reply data accumulated in a buffer and release the buffer.

7. The processor according to claim 1, wherein
the direct memory access controller is further configured to stop execution of new read command while a free space of a buffer is a predetermined criterion or less.

8. The processor according to claim 1, wherein
the issue interval control value is a clock number required to transfer the reply data read out by using the read command, or a clock number required to transfer of the reply data read out by using the read command, and header information.

9. The processor according to claim 1, wherein
in receiving the read command from the engines, the command transfer controller is configured to relate the issue interval control value to the read command received, and
in case that the read command is selected on the arbitration, the crossbar switch is configured to bring a subsequent read command into the arbitration after a period represented an issue interval control value corresponding to a data transfer length of the read command selected, the subsequent read command being transmitted from the engine which has transmitted the read command selected on the arbitration.

10. A data transfer method comprising:
classifying received commands received from a plurality of engines into a read command and an other command;
transmitting a command classified as the read command to a corresponding read-command-input port when receiving the read command from an engine, the corresponding read-command-input port being one of a plurality of read-command-input ports;
transmitting a command classified as the other command to a corresponding other-command-input port when receiving the other command from the engine, the corresponding other-command-input port being one of a plurality of other-command-input ports; and
performing arbitration, by a crossbar switch that includes the read-command-input port and the other-command-input port, to select a command to be executed among the commands transmitted from the engines and outputting the command selected;
wherein in case that the read command is selected on the arbitration, bringing a subsequent read command into the arbitration after a period represented an issue interval control value corresponding to a data transfer length of the read command selected, the subsequent read command is transmitted from the engine which has transmitted the read command selected on the arbitration.

11. The data transfer method according to claim 10, further comprising:
adjusting timing for participating in arbitration of a command in accordance with a data transfer length of the read; and
causing other commands to participate in the arbitration for each clock to fill up an interval of the arbitration described above of the read command.

12. The data transfer method according to claim 10, further comprising, performing the arbitration to select the other command during the period of represented the issue interval control value.

13. The data transfer method according to claim 10, wherein
each of the plurality of engines includes a buffer,
each of the plurality of engines issues a read request to the data in a storage unit and accumulates the data replied from the storage unit in the buffer when the read command transmitted from the engine is selected on the arbitration.

14. The data transfer method according to claim 13, wherein
the storage includes a cache memory and a main memory that belongs to each of a plurality of cores.

15. The data transfer method according to claim 10, wherein
each of the plurality of engines outputs the reply data accumulated in a buffer and frees the buffer.

16. The data transfer method according to claim 10, wherein
each of the plurality of engines stops execution of new read command while a free space of a buffer is a predetermined criterion or less.

17. The data transfer method according to claim 10, wherein
the issue interval control value is a clock number required to transfer the reply data read out by using the read command, or a clock number required to transfer of the reply data read out by using the read command, and header information.

18. The data transfer method according to claim 10, further comprising,
in receiving the read command from the engine, relating the issue interval control value to the read command received, and
in case that the read command is selected on the arbitration, bringing a subsequent read command into the arbitration after a period represented an issue interval control value corresponding to a data transfer length of the read command selected, the subsequent read command being transmitted from the engine which has transmitted the read command selected on the arbitration.

* * * * *